(12) United States Patent
Chien-Chuan

(10) Patent No.: US 6,334,650 B1
(45) Date of Patent: Jan. 1, 2002

(54) FLEXIBLE SEAT PAD WITH POSITION-ADJUSTABLE NAPE AND WAIST RESTS

(76) Inventor: Cheng Chien-Chuan, 9F-1, No. 396, Sec. 1, Nei-Hu Road, Taipei (TW)

( * ) Notice: Subject to any disclaimer, the term of this patent is extended or adjusted under 35 U.S.C. 154(b) by 0 days.

(21) Appl. No.: 09/483,427

(22) Filed: Jan. 12, 2000

(51) Int. Cl.⁷ .................................................. A47C 7/46
(52) U.S. Cl. ............................... 297/284.1; 297/230.11; 297/278.1; 297/452.63
(58) Field of Search .............................. 297/219.1, 224, 297/284.1, 284.3, 284.5, 228.1, 228.11, 228.12, 229, 228.13, 152.63, 230.11, 452.3

(56) References Cited

U.S. PATENT DOCUMENTS

| | | | | |
|---|---|---|---|---|
| 5,190,347 A | * | 3/1993 | Shiow-Lan | 297/230.11 X |
| 5,398,993 A | * | 3/1995 | Chen | 297/230.11 |
| 5,533,787 A | * | 7/1996 | Xiang | 297/284.5 |
| 5,707,107 A | * | 1/1998 | Malone | 297/228.1 |
| 5,808,925 A | * | 9/1998 | Hanley | 297/228.1 X |
| 6,079,784 A | * | 6/2000 | Peachey | 297/284.5 |
| 6,086,152 A | * | 7/2000 | Zeller | 297/284.5 |

* cited by examiner

Primary Examiner—Laurie K. Cranmer
(74) Attorney, Agent, or Firm—W. Wayne Liauh

(57) ABSTRACT

A flexible pad for seat is provided. The pad includes a back pad for attaching to a back of the seat. Two movable covers are connected at upper edges to the back pad at locations separately close to a user's nape and waist. Lower edges of the movable covers can be fixedly or detachably connected to the back pad, such that a receiving space with two open ends is defined between each of the movable covers and the back pad for receiving a nape rest or a waist rest therein. The two rests are long members having a C-shaped profile and covered with an elastic net. The rests are provided at suitable positions with hooking means for firmly hooking the rests onto the back pad. The nape and the waist rests may be adjusted in their vertical and horizontal positions in their receiving spaces relative to the back pad, so that they may most comfortably support a driver's neck and waist to avoid easily growing tired during driving.

10 Claims, 10 Drawing Sheets

FIG·1

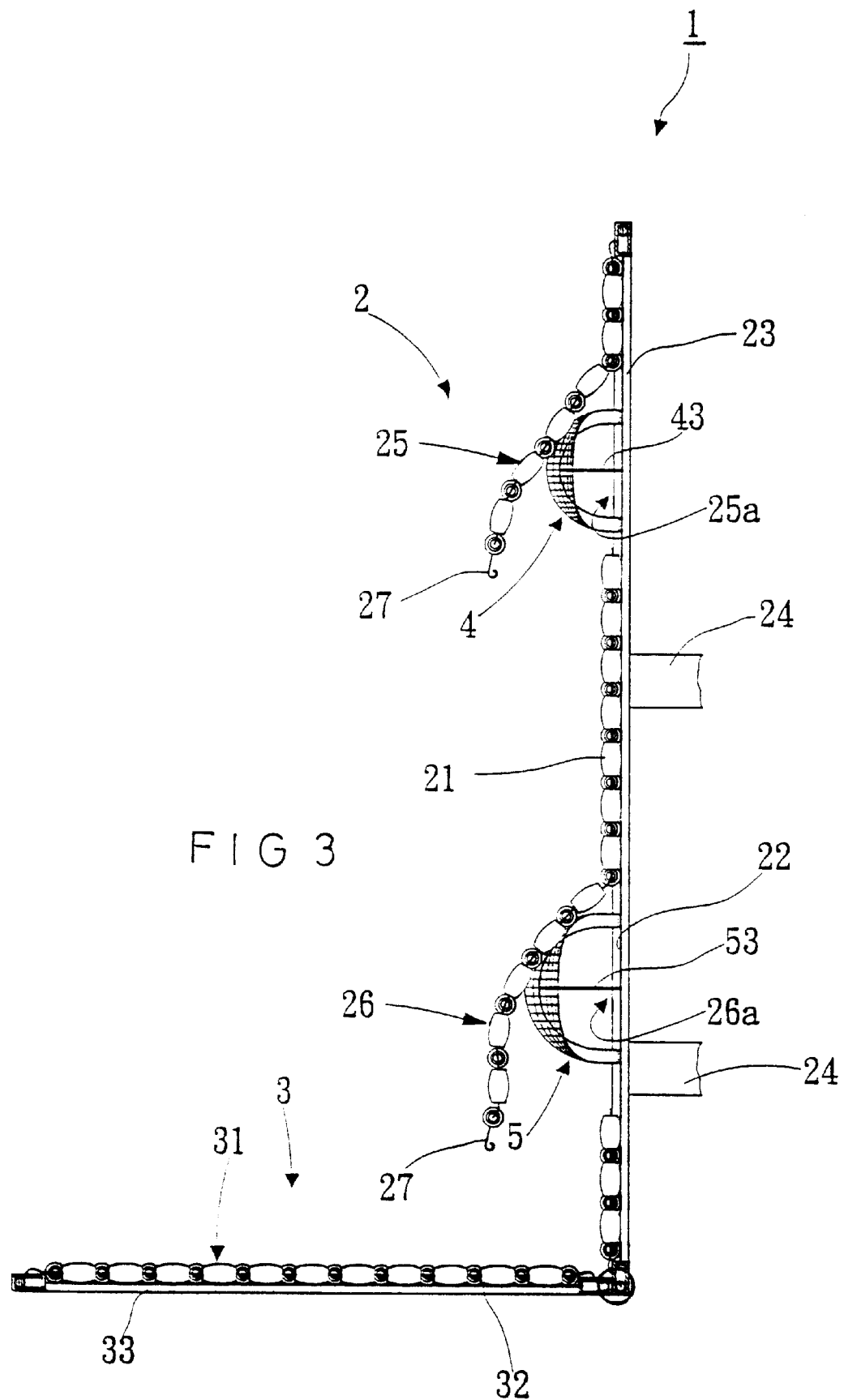

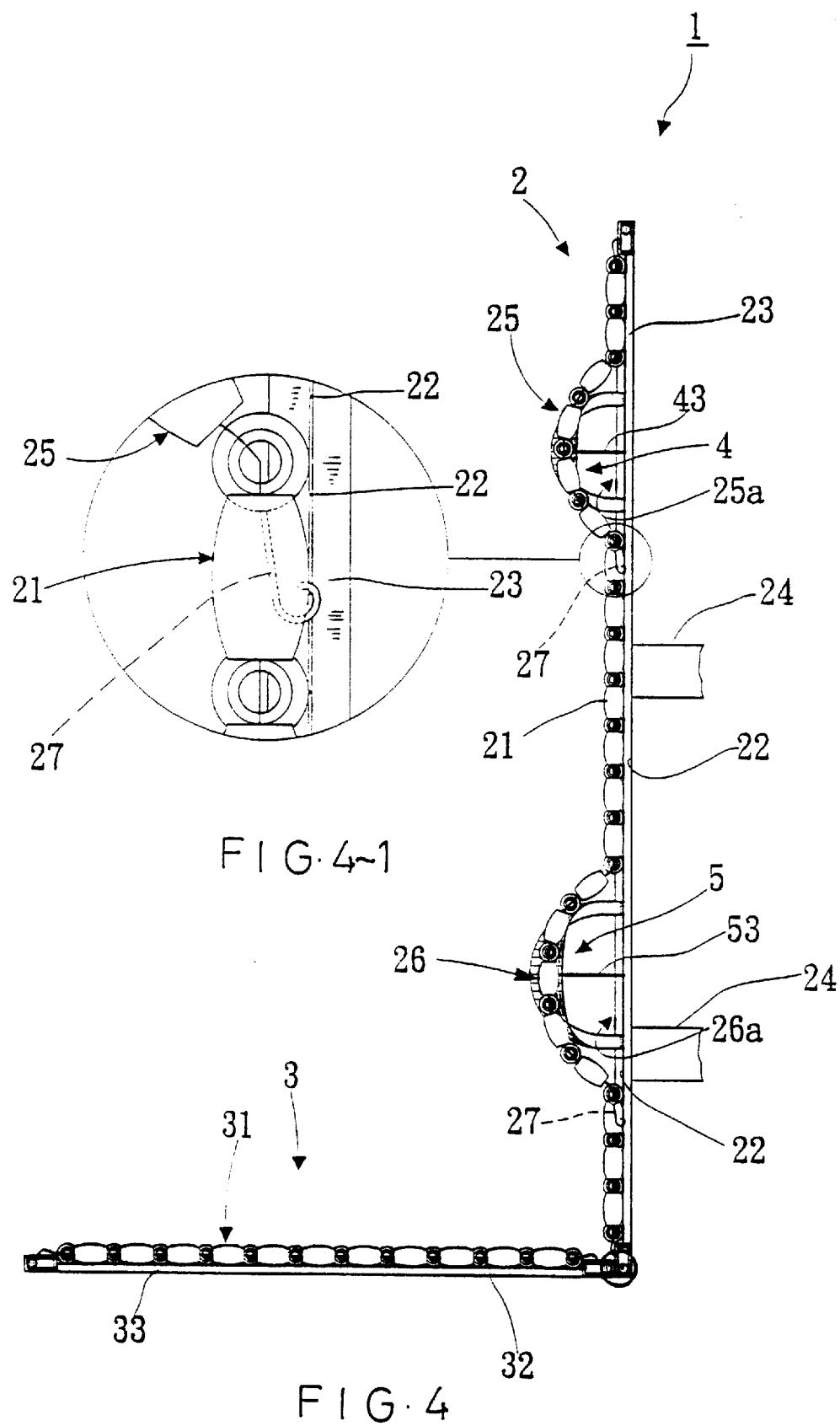

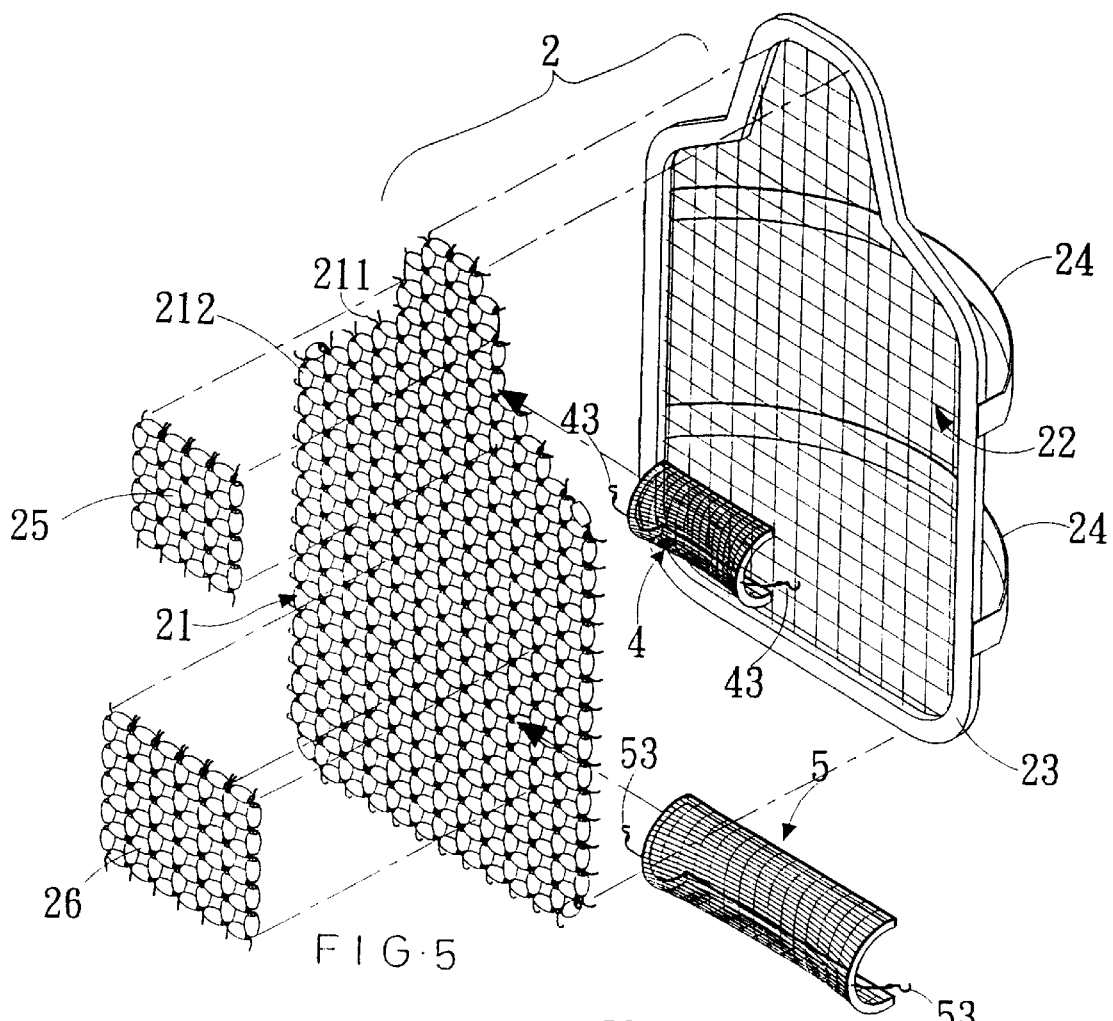
FIG·5
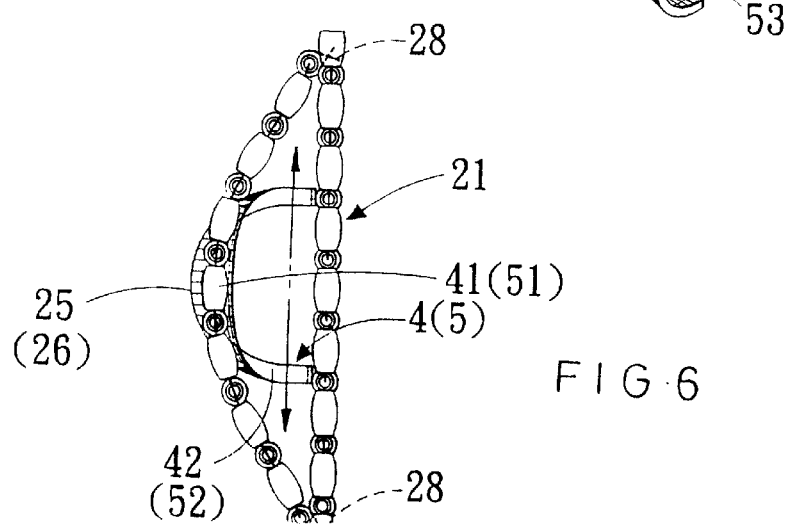
FIG·6

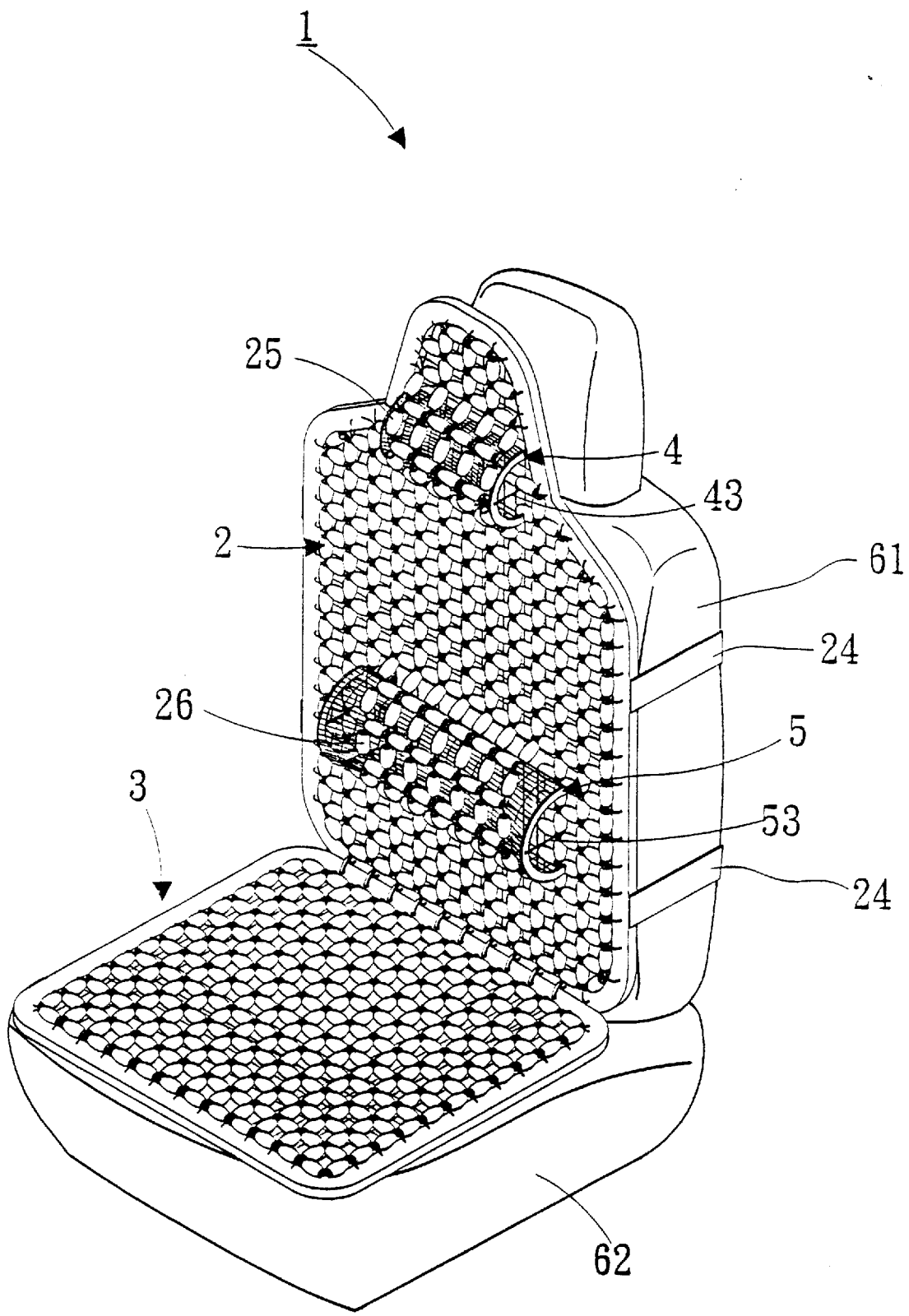
FIG·12

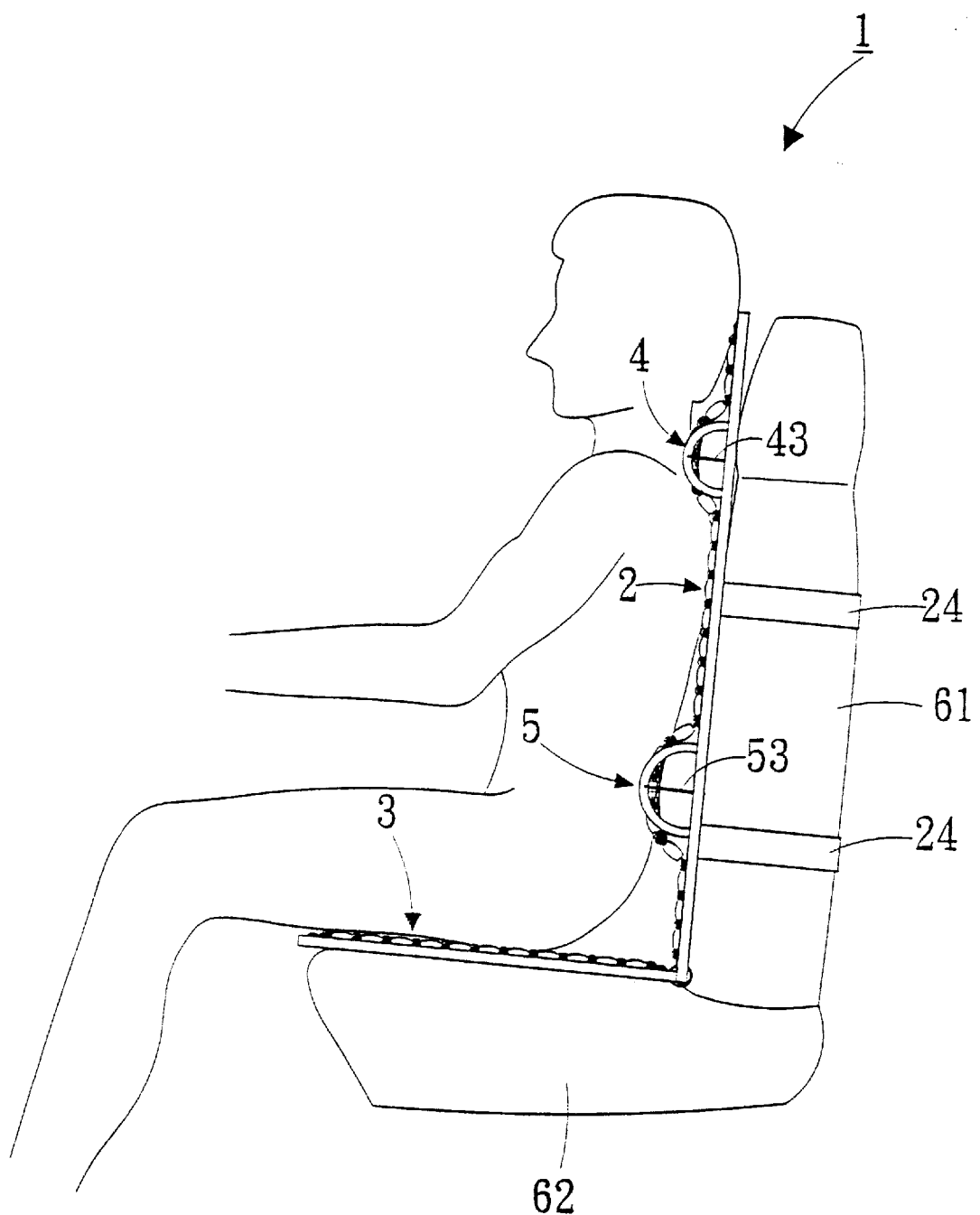
FIG·13

FLEXIBLE SEAT PAD WITH POSITION-ADJUSTABLE NAPE AND WAIST RESTS

BACKGROUND OF THE INVENTION

The present invention relates to a flexible pad for a bucket seat, and more particularly to a flexible bucket seat pad that includes a back pad to which nape rest and/or waist rest may be adjustably attached to help a driver maintain a most comfortable position during driving to avoid easily growing tired.

There are various types of bucket seat pads available in the market. Such pads usually include a back pad and a seat pad that may be either separated from each other for use alone or connected to each other for use as a unit. In all kinds of conventional bucket seat pads, there are rarely properly shaped nape rest and/or waist rest provided on the back pads. Even there are such rests on the back pads, they are not adjustable in position to well match with the shape of the user's body and are therefore not very useful.

It is therefore tried by the inventor to develop a back pad to which properly shaped and raised nape rest and/or waist rest are attached with the positions of these rests being adjustable to meet the body shape of different users.

SUMMARY OF THE INVENTION

A primary object of the present invention is to provide a flexible seat pad with position-adjustable nape and waist rests. To achieve the object, a back pad of the flexible seat pad is provided with two movable covers that are connected at upper edges to the back pad at locations separately close to a user's nape and waist. Lower edges of the movable covers can be fixedly or detachably connected to the back pad, such that a receiving space with two open ends is defined between each of the movable covers and the back pad for receiving a nape rest or a waist rest therein.

The back pad has three different types of structure. The first type of structure includes a beading layer supported on a frame, the second type includes an elastic netting layer supported on a frame, and the third type includes a front beading layer, a rear elastic netting layer, and a frame on which the two layers are supported. The frame is a preformed hard member with suitable flexibility. In the third type of back pad, the movable covers are provided on the front beading layer.

The nape rest and the waist rest are structurally identical and both include elastic netting supported on a preformed hard frame having suitable flexibility. Hooking means may be provided at two sides of the rests for firmly hooking the rests on the back pad.

The following are some of the advantages of the present invention:

1. The nape and the waist rest separately support the user's nape and waist, so that the user may straighten his back up to avoid growing tired easily during driving.

2. The nape and the waist rest are held in place by the movable covers without the possibility of falling off from the seat back. However, the rests may still be adjusted in their position within the movable covers to meet individual user's need.

3. The nape and the waist rest as well as the back pad are air-permeable and therefore comfortable for use.

4. The nape and the waist rest may be easily attached to or removed from the back pad.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is a side view of the flexible seat pad of FIG. 1, wherein two movable covers on a back pad thereof have not been fully covered to fix the nape and the waist rest in place;

FIG. 4 is a side view similar to FIG. 3 with the movable covers fully covered to fix the nape and the waist rest in place;

FIG. 4-1 is a partially enlarged view of FIG. 4 showing the manner of fixing a spring hook of the movable cover to the back pad;

FIG. 5 is an exploded perspective of a back pad according to another embodiment of the present invention;

FIG. 6 is a fragmentary and enlarged side view showing the connection of movable covers to the back pad of FIG. 5;

FIG. 12 shows that the flexible seat pad of the present invention is attached to a bucket seat; and FIG. 13 shows the flexible seat pad of the present invention is attached to a bucket seat and the nape and the waist rest separately comfortably contact with a driver's nape and waist.

DETAILED DESCRIPTION OF THE PREFERRED EMBODIMENTS

Figure 1:
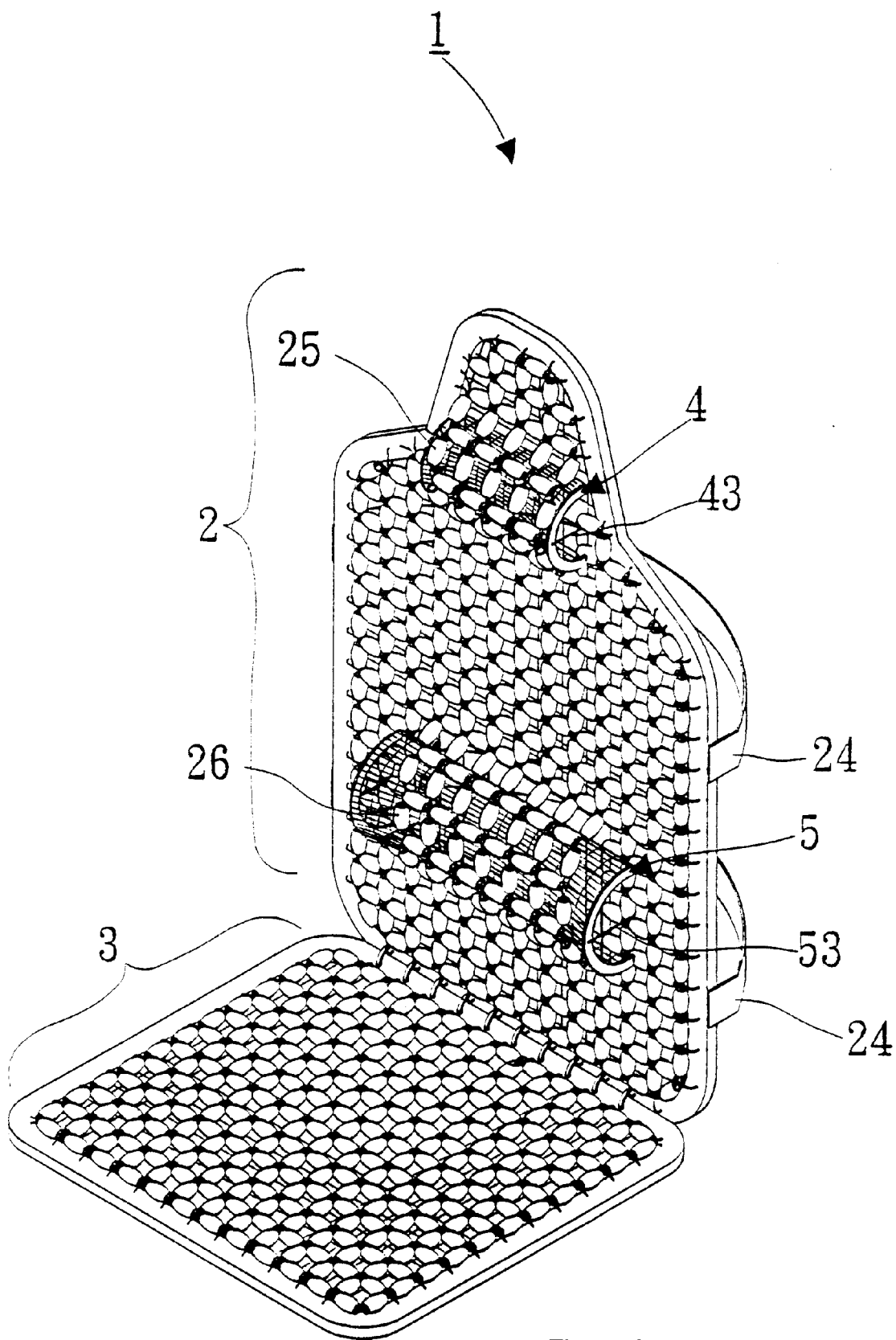
FIG. 1 is a perspective of a flexible seat pad with position-adjustable nape and waist rests according to the present invention.
Figure 2:
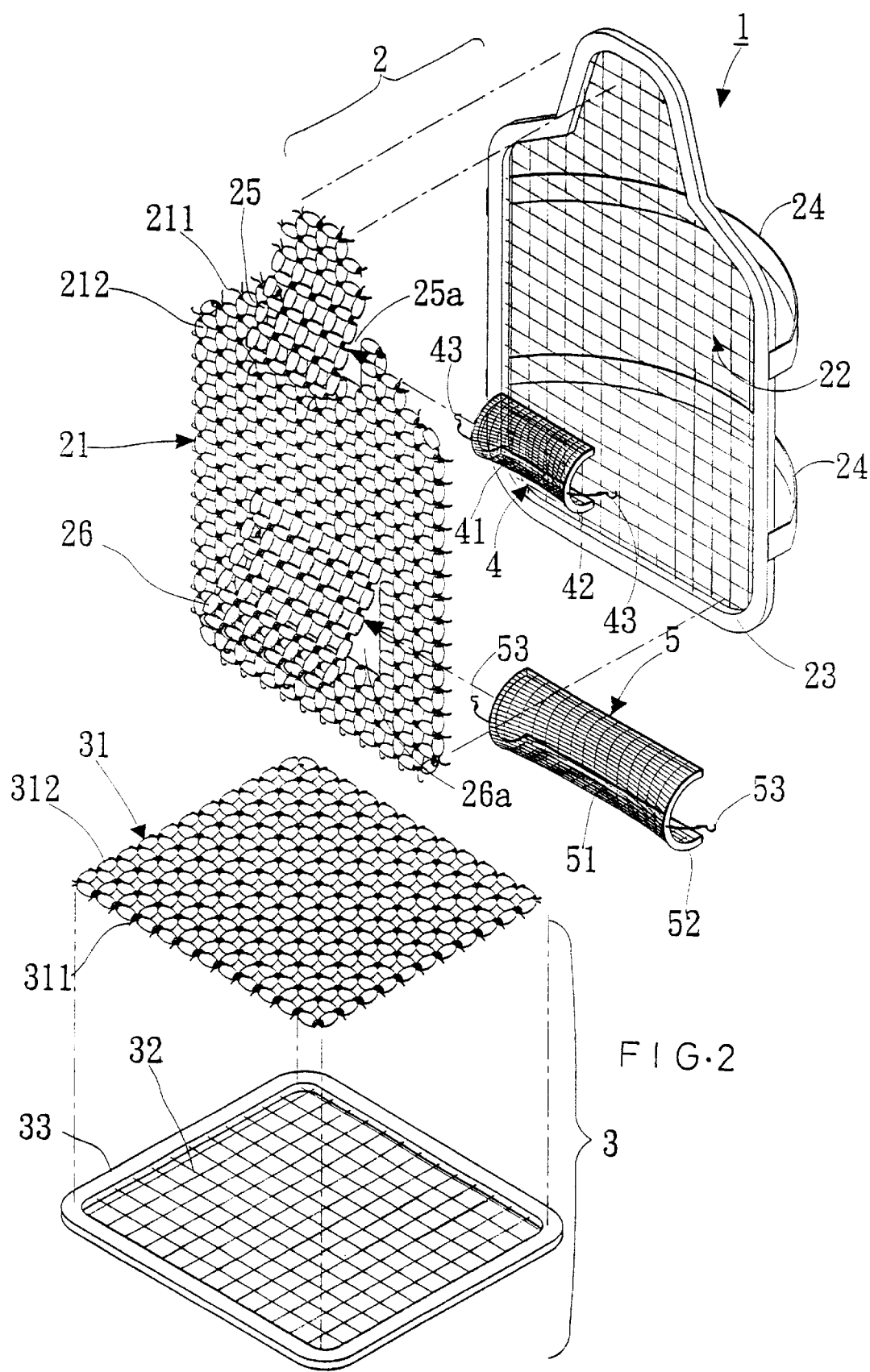
FIG. 2 is an exploded perspective of the flexible seat pad of FIG. 1.

Please refer to FIGS. 1 and 2 that are assembled and exploded perspective views, respectively, of a flexible pad 1 according to a first embodiment of the present invention. As shown, the pad 1 in this first embodiment mainly includes a back pad 2, a seat pad 3, a nape rest 4, and a waist rest 5. The back pad 2 and the seat pad 3 may be either two independent units or two connected parts of an integral unit. The back pad 2 is provided at a reverse side with suitable number of binding bands 24 for easily fixing the flexible pad 1 to, for example, a backrest of a bucket seat. The back pad 2 may be optionally provided at a top thereof with a hood-like portion (not shown) for covering onto a headrest of the backrest to further keep the back pad 2 from moving or falling. The seat pad 3 is used for directly laying over the seat.

As can be clearly seen from FIG. 2, the back pad 2 includes a front beading layer 21, a rear elastic netting layer 22, and a preformed hard frame 23 with suitable flexibility. The beading layer 21 is formed by connecting a plurality of beads 212 with elastic nylon strings 211 threaded through holes on the beads 212 in a predetermined manner. The elastic netting layer 22 includes a plurality of nylon strings 22 woven into a net in a predetermined manner. Ends of the nylon strings 211 and 22 are connected to an inner periphery of the frame 23 in a suitable manner. The frame 23 includes a tubular framing for containing a flexible metal bar therein to provide the frame 23 with good flexibility to avoid bending and deformation. The beads 212 on the beading layer 21 are individually rotatable and can therefore massage a user's back. The nylon strings also enable the elastic netting layer 22 to provide good elasticity.

The seat pad 3 is structurally identical to the back pad 2. That is, the seat pad 3 includes a front beading layer 31, a rear elastic netting layer 32, and a hard frame 33 with suitable flexibility. The beading layer 31 is formed by connecting a plurality of beads 312 with elastic nylon strings 311 threaded through holes on the beads 312 in a predetermined manner. The elastic netting layer 32 includes a plurality of nylon strings 32 woven into a net in a predetermined manner. Ends of the nylon strings 311 and 32 are connected to an inner periphery of the frame 33 in a suitable manner. The frame 33 includes a tubular framing for containing a flexible metal bar therein to provide the frame 33 with good flexibility to avoid bending and deformation.

The nape rest 4 and the waist rest 5 are structurally identical and both include a hard frame 42, 52 that have suitable flexibility and generally C-shaped profile, and a plurality of nylon strings 41, 51 that are woven into a net having a generally C-shaped profile corresponding to that of the frames 42, 52 for fixing onto the frames 42, 52. Spring hooks or the like 43, 53 are provided at two lateral ends of the nape rest 4 and the waist rest 5, respectively, to ensure firm attachment of them to the back pad 2.

The beading layer 21 of the back pad 2 is provided near an upper and a middle portion with movable covers 25, 26, respectively. The movable covers 25, 26 are two pieces of suitably sized beadings structurally similar to the beading layer 21 with their upper edges integrally connected to the beading layer 21 and their lower edges and two lateral edges separated from the beading layer 21. The movable covers 25, 26 could therefore be upward pulled at their lower edges to reveal two openings 25a, 26a, respectively, on the back pad 2. Spring hooks 27 or the like are provided at the lower edges of the movable covers 25, 26, as shown in FIG. 3. By hooking the hooks 27 to either the beading layer 21 or the elastic netting layer 22, as shown in FIGS. 4 and 4-1, the openings 25a, 26a are loosely covered by the movable covers 25, 26. At this point, the nape rest 4 and the waist rest 5 could be sideward positioned into a receiving space with two open ends between the movable covers 25, 26 and the netting layer 22.

The beading layer 21 may also be formed without openings as shown in FIG. 5. In this case, the movable covers 25, 26 are two independent pieces with their upper edges connected to the beading layer 21 by, for example, sewing them in the beading layer 21, as shown in FIG. 6. Lower edges of the movable covers 25, 26 could be fixedly or detachably connected to the beading layer 21 by sewing or with hooking means, such that receiving spaces with open ends are left between the movable covers 25, 26 and the beading layer 21 for sideward positioning the nape rest 4 and the waist rest 5 into these receiving spaces. Due to the woven nylon strings 211, the movable covers 25, 26 are somewhat elastic to sufficiently tightly holding the nape rest 4 and the waist rest 5 in the receiving spaces between the movable covers and the back pad 2.

Since it is easier to produce the back pad 2 with independent movable covers 25, 26 as shown in FIG. 5 than with partially connected movable covers 25, 26 as shown in FIG. 2, a flexible pad 1 with the back pad 2 shown in FIG. 5 is therefore a preferred embodiment of the present invention.

Figure 7:
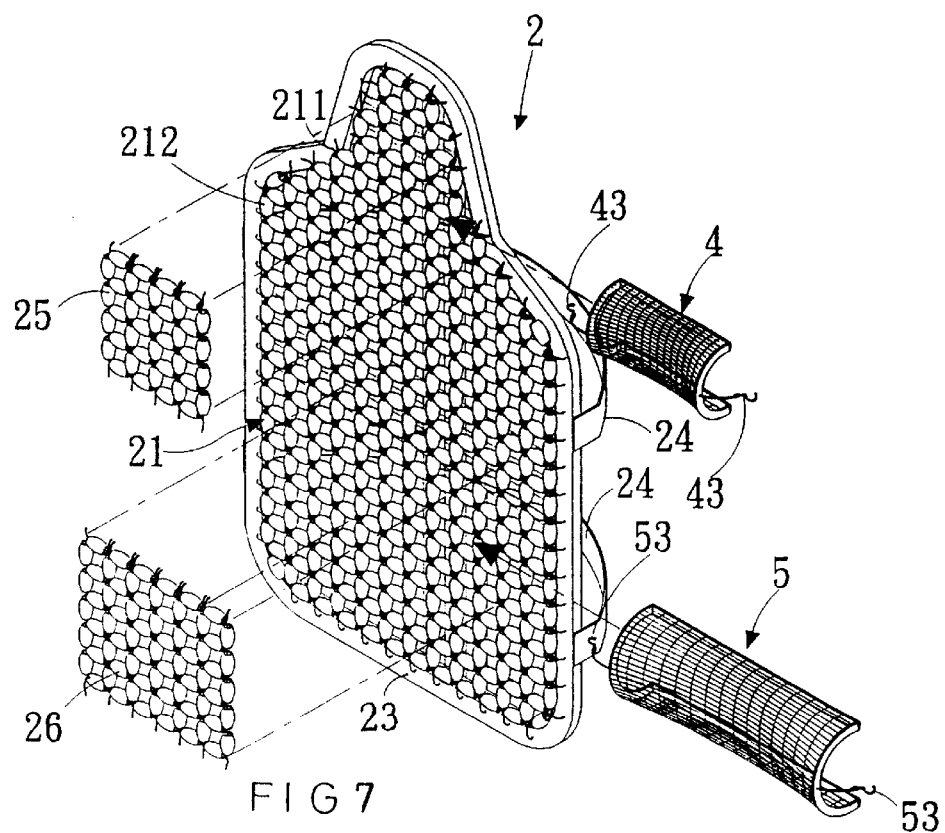
FIG. 7 is an exploded perspective of a back pad according to a further embodiment of the present invention.

FIG. 7 illustrates a first variant of the back pad 2 for the flexible pad 1 of the present invention. In this variant, the back pad 2 includes only the beading layer 21 and the frame 23. The elastic netting layer 22 is omitted. Two movable covers 25, 26 are similarly connected to the beading layer 21 to hold the nape rest 4 and the waist rest 5 between them and the beading layer 21. What is to be noted is, the movable covers 25, 26 may be two pieces of beadings structurally similar to the beading layer 21 or two pieces of nettings structurally similar to the elastic netting layer 22.

Figure 8:
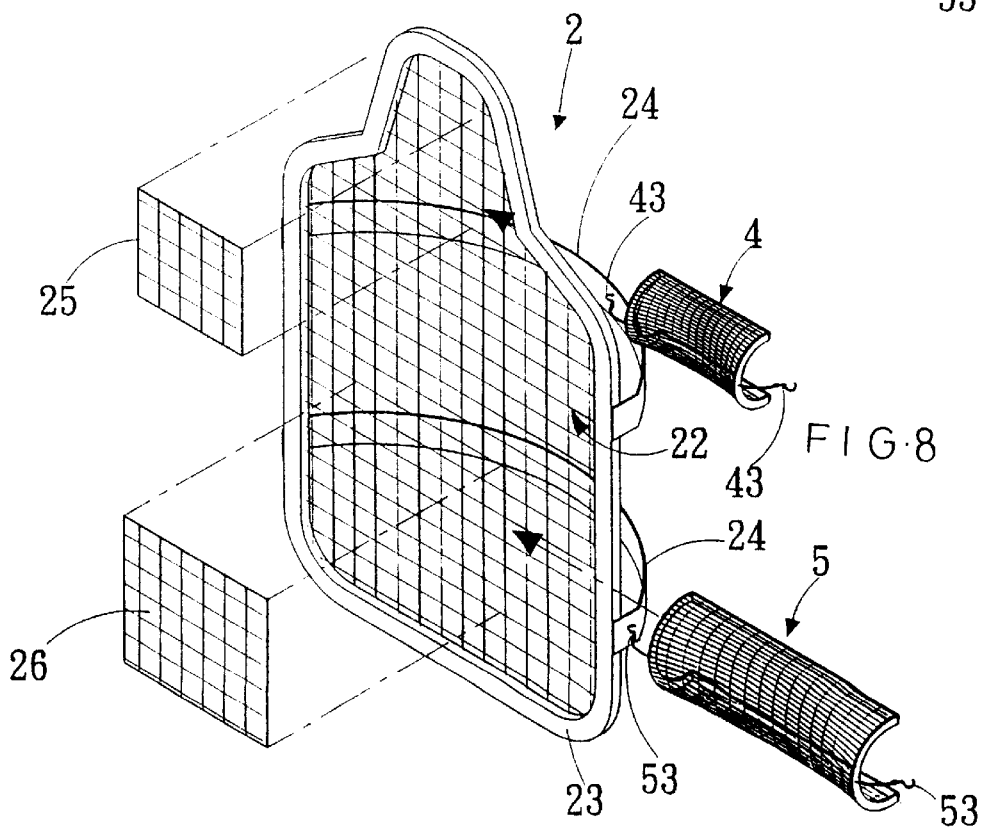
FIG. 8 is an exploded perspective of a back pad according to a still further embodiment of the present invention.

FIG. 8 illustrates a second variant of the back pad 2 of the present invention. In this second variant, the back pad 2 includes only the elastic netting layer 22 and the frame 23. The beading layer 21 is omitted. Two movable covers 25, 26 are similarly connected to the netting layer 22 to hold the nape rest 4 and the waist rest 5 between them and the netting layer 22. What is to be noted is, the movable covers 25, 26 may be two pieces of nettings structurally similar to the elastic netting layer 22 or two pieces of beadings structurally similar to the beading layer 21.

Figure 9:
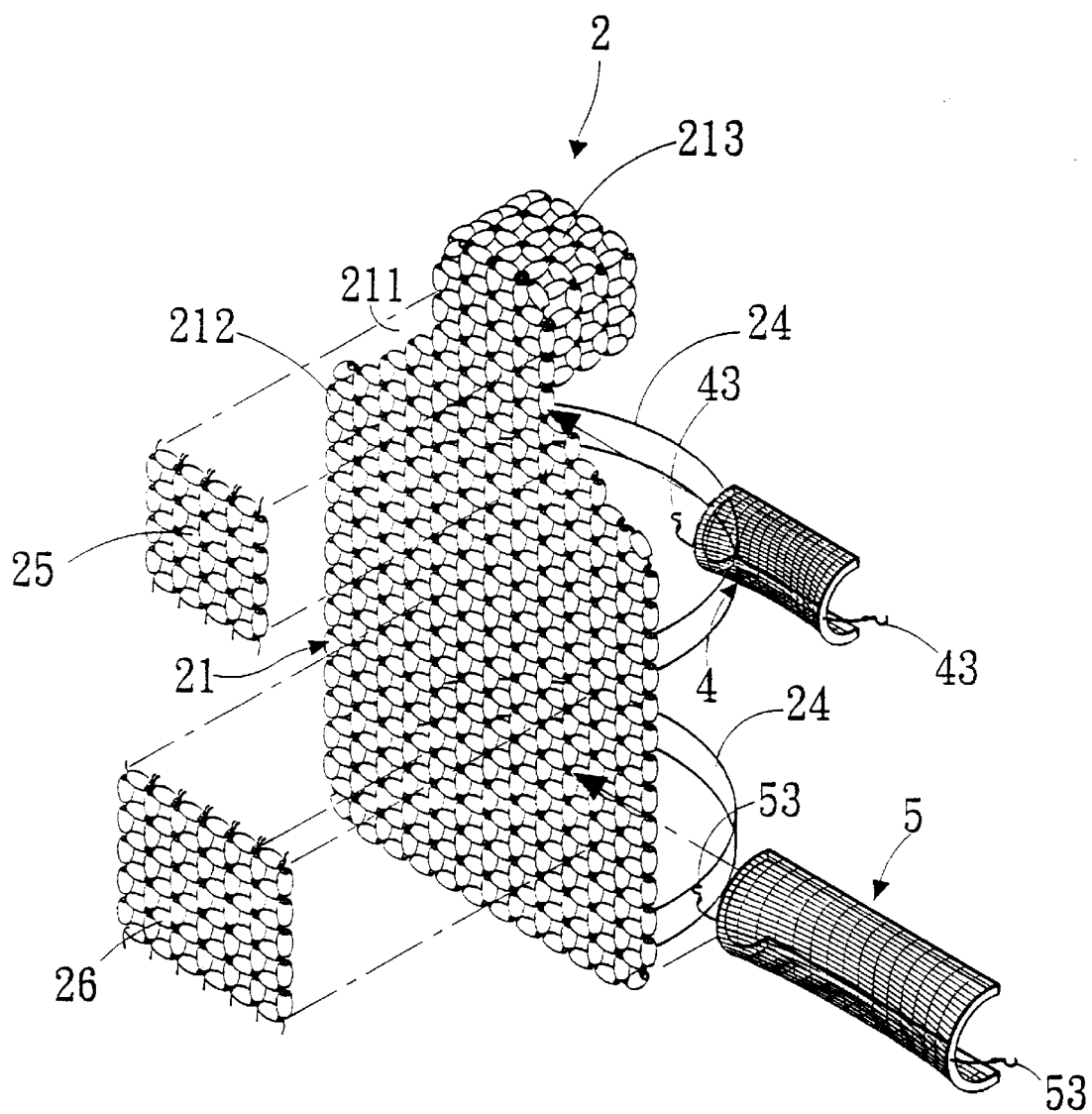
FIG. 9 is an exploded perspective of a back pad according to a still further embodiment of the present invention.
Figure 10:
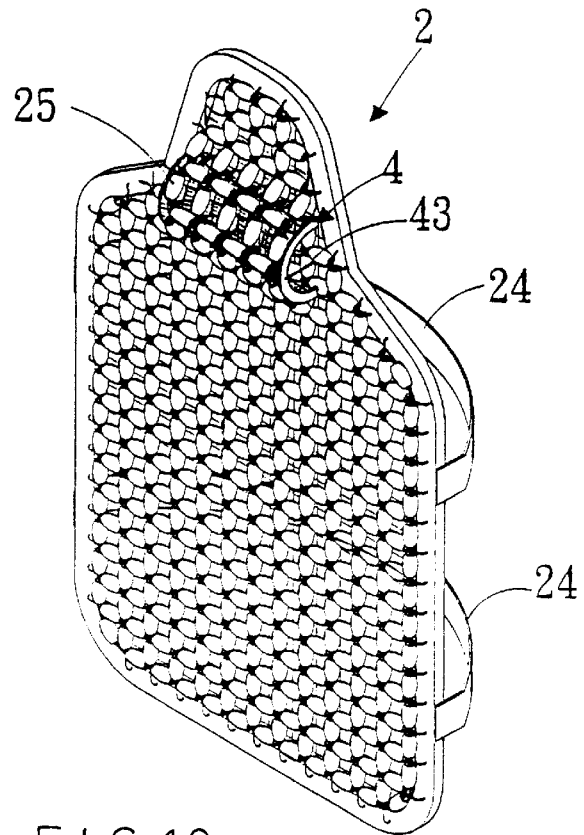
FIG. 10 is a perspective of a variant of the back pad of the present invention.
Figure 11:
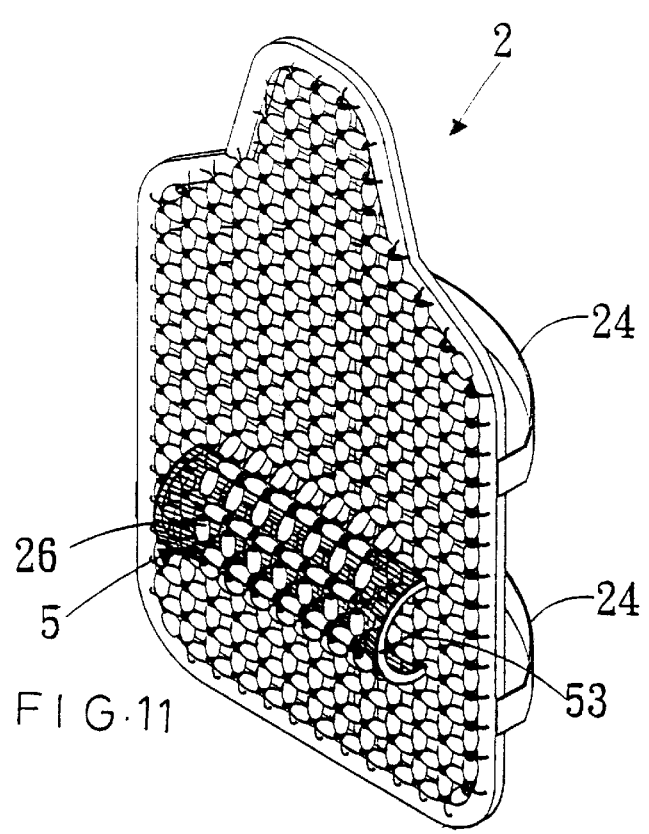
FIG. 11 is a perspective of another variant of the back pad of the present invention.

FIG. 9 is a third variant of the back pad 2 that includes only the beading layer 21 without the netting layer 22 and the frame 23. However, the beading layer 21 in this variant is provided at a top with a hood 213 that is suitable for covering onto a headrest on a back of a seat. The hood 213 cooperates with the binding bands 24 to fasten the beading layer 21 to the back of the seat and avoid the beading layer 21 from falling. Two movable covers 25, 26 are similarly connected to the beading layer 21 to hold the nape rest 4 and the waist rest 5 between them and the beading layer 21. What is to be noted is, the movable covers 25, 26 may be two pieces of beadings structurally similar to the beading layer 21 or two pieces of nettings structurally similar to the elastic netting layer 22.

Any of the above-mentioned back pads 2 of the present invention may also have only the movable cover 25 provided thereat for holding the nape rest 4. The movable cover 26 and the waist rest 5 are omitted.

On the other hand, any of the above-mentioned back pads 2 of the present invention may also have only the movable cover 26 provided at a proper position on the back pad 2 for holding the waist rest 5 in place. The movable cover 25 and the nape rest 4 are omitted.

FIG. 12 illustrates the flexible pad 1 of FIG. 1 being fixed to a bucket seat having a back 61 and a seat 62. The back pad 2 is fastened to the back 61 with binding bands 24 and the seat pad 3 is laid on the seat 62. When a user, for example, a driver, sits on the seat 62, as shown in FIG. 13, the nape rest 4 and the waist rest 5 may be properly adjusted in heights and/or moved leftward or rightward to best match with the driver's shape, so that the driver may have his nape and waist comfortably supported by the nape rest 4 and the waist rest 5, respectively, and straightens his back up without easily growing tired driving.

The nape rest 4 and the waist rest 5 could also be conveniently removed from the back pad 2, if desirable. Users may change the manner of using the pad 1 of the present invention depending on actual need.

What is claimed is:

1. A flexible seat pad comprising a flexible back pad, a nape rest, and a waist rest;

said flexible back pad being provided in upper and middle portions thereof with an upper and a lower movable cover, respectively, said upper and lower movable covers being loosely connected at upper and lower edges to said back pad so that an upper and a lower receiving space with two open ends are defined between each said movable cover and said back pad, and said back pad being so produced that it has suitable elasticity;

said nape rest being positioned in said upper space between said upper movable cover and said back pad via any one of said open ends of said upper receiving space and being elastically held in place by said upper movable cover; and said waist rest being positioned in said lower space between said lower movable cover and said back pad via any one of said open ends of said lower receiving space and being elastically held in place by said lower movable cover;

wherein said back pad includes a front beading layer formed of a plurality of beads connected by elastic strings, a rear netting layer woven from a plurality of elastic strings, and a preformed hard frame with suitable flexibility for framing and supporting said beading layer and said netting layer;

whereby a user may easily adjust vertical and horizontal positions of said nape and said waist rests relative to said back pad by properly shifting said nape and said waist rests held between said movable covers and said elastic back pad, so that said nape and said waist rests are located at positions most comfortably supporting the user's nape and waist.

2. A flexible seat pad as claimed in claim 1, wherein said back pad includes a netting layer formed of a plurality of elastic strings woven into a net and a preformed hard frame with suitable flexibility for framing and supporting said netting layer.

3. A flexible seat pad as claimed in claim 1, wherein said nape rest and said waist rest are identically structured long members each including a preformed hard frame having suitable flexibility and generally C-shaped profile, and a plurality of elastic strings woven into a net being framed and supported by said C-shaped frame.

4. A flexible seat pad as claimed in claim 1, wherein said nape rest and said waist rest are provided at two lateral ends with hooking means for hooking said nape rest and said waist rest to said back pad at selected positions.

5. A flexible seat pad as claimed in claim 1, wherein either said upper movable cover or said lower movable cover may be omitted.

6. A flexible seat pad as claimed in claim 1, wherein said upper and said lower movable cover are connected to said back pad by sewing upper and lower edges of said movable covers in said back pad.

7. A flexible seat pad as claimed in claim 1, wherein upper edges of said upper and said lower movable covers are integrally connected to said back pad, and lower and lateral edges of said upper and said lower movable covers are separated from said back pad, and said back pad having two openings formed thereon corresponding to and being covered by said upper and said lower movable covers.

8. A flexible seat pad as claimed in claim 1, wherein upper edges of said upper and said lower movable covers are fixedly connected to said back pad, and lower edges of said upper and said lower movable covers are provided with spring hooks or the like for hooking said lower edges onto said back pad.

9. A flexible seat pad comprising a flexible back pad, a nape rest, and a waist rest;

said flexible back pad being provided in upper and middle portions thereof with an upper and a lower movable cover, respectively, said upper and lower movable covers being loosely connected at upper and lower edges to said back pad so that an upper and a lower receiving space with two open ends are defined between each said movable cover and said back pad, and said back pad being so produced that it has suitable elasticity;

said nape rest being positioned in said upper space between said upper movable cover and said back pad via any one of said open ends of said upper receiving space and being elastically held in place by said upper movable cover; and said waist rest being positioned in said lower space between said lower movable cover and said back pad via any one of said open ends of said lower receiving space and being elastically held in place by said lower movable cover;

wherein said back pad includes a beading layer formed of a plurality of beads connected together by elastic strings and a preformed hard frame with suitable flexibility for framing and supporting said beading layer.

10. A flexible seat pad comprising a flexible back pad, a nape rest, and a waist rest;

said flexible back pad being provided in upper and middle portions thereof with an upper and a lower movable cover, respectively, said upper and lower movable covers being loosely connected at upper and lower edges to said back pad so that an upper and a lower receiving space with two open ends are defined between each said movable cover and said back pad, and said back pad being so produced that it has suitable elasticity;

said nape rest being positioned in said upper space between said upper movable cover and said back pad via any one of said open ends of said upper receiving space and being elastically held in place by said upper movable cover; and said waist rest being positioned in said lower space between said lower movable cover and said back pad via any one of said open ends of said lower receiving space and being elastically held in place by said lower movable cover;

wherein said back pad includes one single beading layer formed of a plurality of beads connected together by elastic strings.

\* \* \* \* \*